United States Patent [19]

Inoue et al.

[11] Patent Number: 4,856,918
[45] Date of Patent: Aug. 15, 1989

[54] BEARING DEVICE

[75] Inventors: Gentei Inoue; Ikunori Sakatani, both of Fujisawa; Katsuhiko Tanaka, Yamato, all of Japan

[73] Assignee: Nippon Seiko Kabushiki Kaisha, Tokyo, Japan

[21] Appl. No.: 176,038

[22] Filed: Mar. 9, 1988

[30] Foreign Application Priority Data

Mar. 10, 1987 [JP] Japan .................................. 62-54387
May 11, 1987 [JP] Japan ................................. 62-112282
Jul. 31, 1987 [JP] Japan ................................. 62-191724

[51] Int. Cl.$^4$ ....................... F16C 19/50; F16C 32/06; F16C 17/04
[52] U.S. Cl. .................................... 384/610; 384/108; 384/245
[58] Field of Search ................... 384/107–109, 384/121, 123, 126, 240, 243–245, 610

[56] References Cited

U.S. PATENT DOCUMENTS 2,300,362 10/1942 Shotter ............................... 384/245
4,547,081 10/1935 Tanaka ............................ 384/121 X

FOREIGN PATENT DOCUMENTS 0005518 1/1983 Japan .................................. 384/107

Primary Examiner—Thomas R. Hannon
Attorney, Agent, or Firm—Basile and Hanlon

[57] ABSTRACT

A bearing device of a rotary cylinder for a magnetic head includes a fixed shaft and a sleeve rotatably supported about the fixed shaft through a radial bearing. A thrust receiver secured to one axial end of the sleeve has a convex spherical surface at the side confronting the fixed shaft, and a concave spherical surface is formed on an end surface of the fixed shaft confronting the convex spherical surface. A radius of curvature of the concave spherical surface is larger than a radius of curvature of the convex spherical surface of the thrust receiver.

3 Claims, 2 Drawing Sheets

BEARING DEVICE

BACKGROUND OF THE INVENTION

1. Field of the Invention

The present invention relates to a bearing device and a method for manufacturing the same used for audio appliances, video appliances and business machines.

2. Description of the Prior Art

A bearing device comprising a rotary cylinder for a magnetic head used in audio appliances, video appliances, and the like is known in the art, and typically has a structure as shown in FIG. 1.

In this bearing device, a lower end portion of a shaft member 10, serving as a fixed shaft, is secured to a lower cylinder 30 by pressing the shaft member 10 thereinto. A sleeve 20, which is secured to an upper cylinder 32, is rotatably mounted around the shaft member 10. Herringbone shaped dynamic pressure producing grooves 11a and 11b, for producing a dynamic pressure, are formed in outer surface 15 of the shaft member 10 to form a radial fluid bearing of the dynamic type for supporting the sleeve 20 radially. A thrust receiver 22, comprising a spherical member, is pressed into the inside of the sleeve 20 and secured to an axial upper end portion thereof. An upper end surface 12 (plane) of the shaft member 10 in the axial direction is opposed directly, or indirectly if a lubricant is disposed therebetween, to the thrust receiver 22 to form a thrust bearing of the pivot type for supporting the sleeve 20 axially.

In an upper surface of the upper end of the sleeve 20 is formed an air escape groove 23 extending in the axial direction to create a space extending between the upper end 12 of the shaft member 10 and the thrust receiver 22, to the outside atmosphere. An air escape hole 24 is also formed at an intermediate portion of the sleeve 20, penetrating a side wall thereof in a radial direction, to bring a space 21 extending between the outer surface of the shaft member 10 and the sleeve 20 to the outside atmosphere thereby reducing any air resistance at the time of assembling the bearing device, and to allow air bubbles contained in the lubricant, which may comprise oil or the like, to escape to the outside.

A driving motor for the bearing device includes a cylindrical rotor magnet 34 fixed to a disk 33 which is, in turn, secured to the outer surface of the sleeve 20. A stator coil 35 is fixed to an inner surface of a side wall of the lower cylinder 30. The inner cylindrical surface 25 of the stator coil 35 opposes to the outer surface 26 of the rotor magnet 34 with an air gap 27 therebetween.

Further, a stationary rotary transformer 36 of a cylindrical shape is fixed to the lower cylinder 30 so that the stationary rotary transformer 36 surrounds the peripheral surface of a lower portion of the sleeve 20. A rotating rotary transformer 37 is fixed to the disk 33 such that the cylindrical inner surface 41 of the rotating rotary transformer 37 opposes to the peripheral outer surface 42 of the stationary rotary transformer 36. A signal from a magnetic head 38, fixed to the upper cylinder 32, is transmitted to the stationary rotary transformer 36 through the rotating rotary transformer 37.

The bearing device described above is driven with a lubricant such as oil or grease filled into space 21 of the radial bearing between the sleeve 20 and the shaft member 10. Alternatively, a gas such as air may be used as the lubricant.

When the stator coil 35 of the driving motor is energized, a rotational force is produced in the rotor magnet 34, and the sleeve 20 and each of its accessory parts, secured directly or indirectly to the sleeve 20, are rotated as a unit. As the sleeve 20 rotates, a dynamic pressure is produced by the dynamic pressure producing grooves 11a and 11b of the shaft member 10 to form a fluid film in the space 21 of the radial bearing. As a result, the sleeve 20 is supported radially by the pressure of the fluid film, thus maintaining a non-contacting condition with respect to the shaft member 10. At the same time, since the thrust receiver 22 is brought into point-contact with the upper surface 12 of the shaft member 10, the sleeve 20 is rotated while being supported in the axial direction by the shaft member 10.

In the foregoing bearing device, the thrust receiver 22 generally has a hardness higher than that of the shaft member 10. However, in the prior art bearing device, since the end surface 12 of the shaft member 10 opposing the thrust receiver 22 is a flat plane surface, the end surface 12 of the shaft member 10 is subjected to a large surface pressure at the point of contact with the thrust receiver 22. Thus, a large amount of wear is caused. As a result, the unfavorable situation occurs in which the height of the magnetic head 38, fixed to the upper cylinder 32, decreases gradually while the bearing device is being used.

According to experiments conducted by the inventors of the present application, by using a shaft member 10 of a hardened stainless steel round bar (SUS 420J2) and a thrust receiver 22 of a hardened steel ball (SUJ2), the wear at the end surface 12 of the shaft member 10 amounted to 5 $\mu$m or larger after several hundreds of hours use, even when oil is used as the lubricant.

However, in the bearing device of this type, it is required to maintain the change in the height of the magnet head 38, during use, as small as possible. For example, the change in the height is limited to 5 $\mu$m or less. Accordingly, the development of a bearing device which meets such a requirement has been needed.

SUMMARY OF THE INVENTION

This invention was made to satisfy the aforementioned requirements, and it is an object of the invention to provide a bearing device which is resistant to wear at the end surface of a shaft member which is in point contact with a thrust receiver, and to provide a method for manufacturing the same.

In a bearing device according to the present invention, a thrust receiver has a convex spherical surface at its center, extending in a radial direction, opposing a shaft member. In one embodiment, the thrust receiver may constitute a spherical member. An end surface of the shaft member opposing the convex spherical surface has a concave spherical surface having a radius of curvature larger than that of the convex spherical surface of the thrust receiver. Further, the hardness of the shaft member is preferably equal to HRC40 or higher. In contrast, the hardness of the thrust receiver is preferably in a range of HRC 60~67, and preferably made of cemented carbide having an Hv 1300 or larger. Thus, the shaft member has a hardness value lower than that of the thrust receiver.

A basic feature of a method for manufacturing the bearing device is to use a pressing member which is secured to an end portion of a cylindrical member, in the axial direction thereof, which has a hardness higher than that of the shaft member.

Furthermore, the surface of the pressing member opposing the shaft member has, at the center in the radial direction thereof, a convex spherical surface. The shaft member is fitted into the inside of the cylindrical member. Since the pressing member is harder than the shaft member, at least one of the shaft member and the pressing member is applied with a pressing load in the axial direction to cause a plastic deformation on the end surface of the shaft member by the pressing member. Thus, a concave spherical surface is formed on the end surface of the shaft member. As noted above, a spherical member may be used as the pressing member.

As described in the foregoing, in the bearing device of the present invention, the surface of the thrust receiver opposing the shaft member has a convex spherical surface at the center extending in the radial direction, and the end surface of the shaft member opposing the convex spherical surface has a concave spherical surface having a larger radius of curvature than that of the convex spherical surface of the thrust receiver. Consequently, the pressure at the contact surface between the convex spherical surface of the thrust receiver and the concave surface of the shaft member is reduced, and the amount of wear can be reduced to a great extent. For this reason, in the present invention, it is possible to solve the problem involved in a device such as a rotary cylinder having a magnetic head attached thereto in which a change in the axial height is severely limited, and a bearing device most suitable for this type of rotary cylinder can be obtained.

Furthermore, by selecting a hardness of the shaft member to be HRC40 or higher, the wear of the concave spherical surface can be reduced. Further, the concave spherical surface can be formed by a plastic deformation on the end surface of the shaft member having a high hardness after having been subjected to hardening and tempering. If such a shaft member is used, since the hardness of the concave spherical surface is high, scratches are seldom caused. In addition, since the hardening and tempering are not needed to the concave spherical surface, no deformation is caused due to the heat treatment.

Moreover, because the formation of the concave spherical surface is easy, and the concave spherical surface is hardened by the work, the wear of the concave surface is further reduced.

Furthermore, if the convex surface of the thrust receiver is made of cemented carbide, powder will seldom be produced by wear, and additional wear due to the produced powder will not be promoted. Thus, the amount of wear of the thrust receiving surface of the shaft member can be reduced to a very small amount.

In a method of manufacturing a bearing device of the present invention, at least one of a pressing member fixed to a cylindrical member and a shaft member inserted into the cylindrical member is applied with a pressing load, and a plastic deformation is formed on an end surface of the shaft member. Accordingly, a concave spherical surface can be formed in a very simple operation and yet with a high accuracy in the radius of curvature. Thus, a manufacturing method suitable for mass production of the thrust bearing can be provided.

Furthermore, when a thrust receiver and a sleeve which are component parts of the final product are used, special forming jigs are not needed. The advantage is provided in that the shaft member can be worked simply by using the component parts of the bearing device, and the assembling of the bearing device is also completed simultaneously with the work.

Other objects and features of the invention will become apparent by reference to the following specification and to the drawings.

DESCRIPTION OF THE PREFERRED EMBODIMENTS

An embodiment of the present invention will be described with reference to FIGS. 2 through 4.

Figure 2:
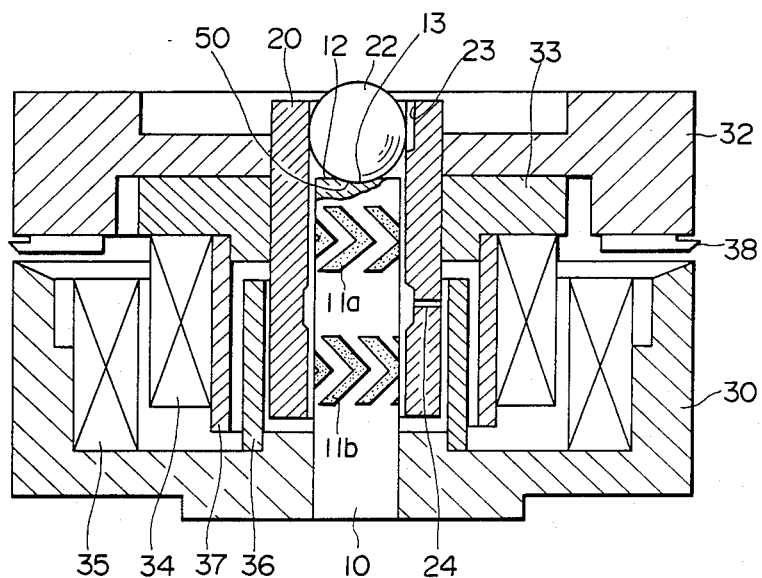
FIG. 2 is a longitudinal sectional view of an embodiment wherein the present invention is applied to a rotary cylinder for a magnetic head.
Figure 3:
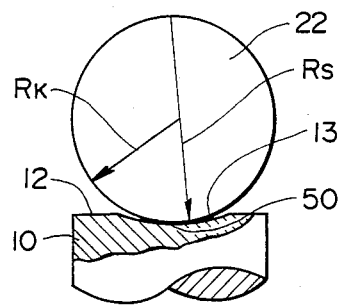
FIG. 3 is an enlarged side view of a principal part of FIG. 2.

As shown in FIG. 2, a thrust receiver 22 comprises a spherical member, or other member having a convex spherical end surface 50 at the center and extending in a radial direction, which surface opposes an end surface 12 of a shaft member 10. The end surface 12 opposing the convex spherical surface 50 of thrust receiver 22 has a concave spherical surface 13 at the center which extends in a radial direction. A radius of curvature Rs of the concave spherical surface 13 is, as shown in FIG. 2, larger than a radius of curvature Rk of the convex spherical surface 50, and a thrust bearing is constituted by the convex spherical surface 50 and the concave spherical surface 13.

In a preferred embodiment, the hardness of the shaft member 10 is preferably equal to HRC40 or higher, and the hardness of the thrust receiver 22 is preferably in a range of HRC60 to 67. Thus, the hardness of the shaft member 10 is lower than that of the thrust receiver 22. It is possible to make the hardness of the thrust receiver 22 equal to Hv 1300 or larger, and in this case, the thrust receiver 22 is made of, for example, Wc-Co alloy, or other cemented carbide of the tungsten carbide group.

Figure 1:
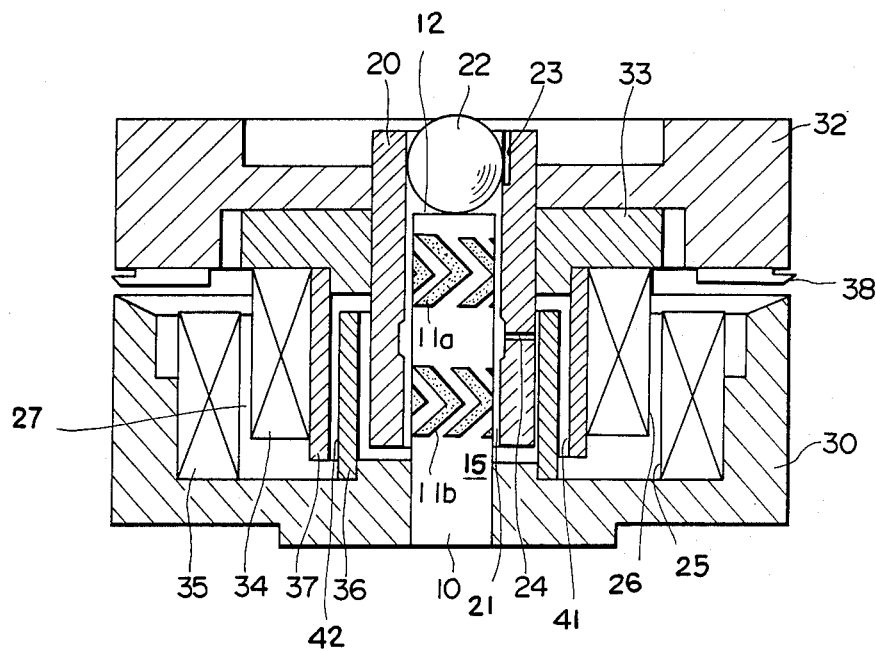
FIG. 1 is a longitudinal sectional view of a prior art rotary cylinder for a magnetic head.

The structure of parts other than those mentioned above are the same as in the prior art bearing device of FIG. 1, and identical parts are assigned with identical reference numerals, and repeated descriptions are omitted.

Figure 4:
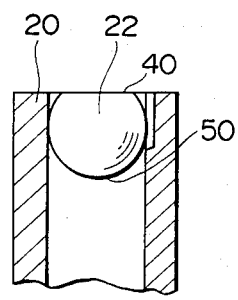
FIG. 4 is a longitudinal sectional view of a thrust bearing and a sleeve showing another embodiment of the present invention.

An alternative embodiment, shown in FIG. 4, discloses a thrust receiver 22 which is not a sphere. A surface 40, located at an opposite side with respect to the end surface 12 of the shaft member 10, is a plane surface having a radius smaller than the radius of curvature of the convex spherical surface 50 of the thrust receiver 22. By employing such a structure, the size in the axial direction, of a member including the sleeve 20 and the thrust receiver 22, can be reduced.

Next, a method for manufacturing a bearing device structured as described above will be described.

A cylindrical member (not shown) having an inner diameter slightly larger than shaft member 10 is formed to allow sliding engagement of said member around the outer periphery of shaft member 10. A pressing member having a hardness higher than the shaft member 10 is fixed to the inside of the cylindrical member, at one end in the axial direction, by press fitting, or the like. The resulting apparatus is referred to as a forming jig for use in forming shaft member 10 of the present invention. The shaft member 10 is inserted into the forming jig. The surface of the pressing member opposing the end surface 12 of shaft member 10 has a convex spherical surface at the center which extends in a radial direction. The hardness of shaft member 10 is lower than that of the pressing member, which is generally equal to HRC40 or higher. A spherical member may be used as the pressing member.

The shaft member 10 is fixed in place in the forming jig and the pressing member of the jig is pressed against the end surface 12 of shaft member 10 to apply a predetermined pressing load. Alternatively, shaft member 10 may be pressed against the pressing member of the jig which is fixed, or both the jig and the shaft member 10 may be pressed in the axial direction against each other to apply the pressing load to the end surface 12 of the shaft member 10. An air escape groove is formed in the inner surface at one end of the cylindrical member to enable air trapped in the space between the shaft member 10 and the pressing member to pass therethrough to the atmosphere. Due to the pressing load, plastic deformation and elastic deformation are caused in the end surface 12 of the shaft member 10 by the pressing member, which is harder than the shaft member 10. Following deformation, the pressing load is removed, allowing the deformed end surface 12 of shaft 10 to spring back to the extent of the elastic deformation. As a result, a concave spherical surface 13 having a radius of curvature Rs larger than a radius of curvature Rk of the convex spherical surface of the pressing member is formed in the end surface 12 of the shaft member 10.

The gap between the cylindrical membre of the jig and the shaft member 10 in the radial direction can be made smaller than the gap between the sleeve 20 of the end product and the shaft member 10. As a result, a concave spherical surface 13, having small eccentricity from the axis of the shaft member 10, can be formed on the end surface 12 of the shaft member 10.

Furthermore, by using a pressing member of the forming jig, whose convex spherical surface has a different radius of curvature than the radius of curvature Rk of the convex spherical surface 50 of the thrust receiver 22 used in the end product, it is possible to form on the end surface 12 of shaft member 10 a concave spherical surface 13 having a different radius of curvature Rs in accordance with the radius of curvature of the convex spherical surface of the pressing member.

In place of the aforementioned forming jig, the thrust receiver 22 and the sleeve 20, used in the end product, may be used such that the thrust receiver 22 is fixed to the sleeve 20 by press fitting or the like. Other accessories may or may not be attached to the assembly. In this case, the shaft member 10 may be fixed to the lower cylinder 30 by press fitting or the like beforehand, or the shaft member 10 may not be fixed. In either case, by performing a similar operation to that described in the foregoing, the concave spherical surface 13 can be formed on the end surface 12 of the shaft member 10.

Where the forming jig is not used, the sleeve 20 having the thrust receiver 22 secured therein is slidingly engaged around the shaft member 10, and a predetermined pressing load is applied to form the concave surface 13. In so doing, simultaneously with the formation of the concave surface 13, an assembled bearing device is obtained.

Test samples manufactured in accordance with the aforementioned method, and the results of wear tests on these test samples are as follows.

As the thrust receiver 22, a steel ball (SUJ2) for a bearing having a diameter of about 1.5 mm and which has been subjected to hardening and tempering (hardness HRC62~64) was used. The steel ball was press fitted into the inside of the sleeve 20, which is a component part of the bearing device. As the shaft member 10, a stainless round steel rod (SUS 420J2) having a diameter of about 1.5 mm, slightly smaller than the diameter of the thrust receiver 22, and which has been subjected to hardening and tempering (hardness HRC 57~58) was used. The shaft member 10 was fitted in the sleeve 20, and pressed in the axial direction by applying a pressing load of about 10 kgf thereto. As a result, a concave spherical surface 13 having a diameter of about 3 mm (a radius of curvature of about 1.5 mm) was formed on the end surface 12 of the shaft member 10. In this manner, even when the end surface 12 of shaft member 10 is pressed against the spherical member which is the thrust receiver 22, it is possible to form, by plastic and elastic deformation, the concave spherical surface 13 having a larger radius of curvature Rs than a radius of curvature Rk of the convex spherical surface 50, on the end surface 12 of the shaft member 10.

This test sample was used without any change for the wear test. It was ascertained that substantially no wear was caused on the concave spherical surface 13, formed according to the present invention, even after several hundred hours elapsed as compared with the prior art bearing device in which, as described in the foregoing, an amount of wear equal to 5 μm or larger was caused on the end surface of the shaft member after the same time period elapsed.

In this case, the hardness of the shaft member 10 is preferably equal to HRC 40 or higher, and the hardness of the pressing member is preferably within a range of HRC 60~67. When the hardness of the shaft member 10 is lower than HRC 40, wear of the concave spherical surface 13 of the shaft member 10 is easily caused, and on the other hand, when the hardness of the shaft member 10 is made harder than the pressing member, plastic deformation of the shaft member 10 is not caused. The pressing member is only required to have a hardness higher than that of the shaft member 10. However, when the hardness of the pressing member is made lower than HRC 60, plastic deformation of the shaft member 10 becomes difficult to be caused whereas when the hardness of the pressing member is made higher than HRC 67, heat treatment becomes difficult.

In this connection, the hardness of the thrust receiver 22 may be high or low. However, it is preferable that the hardness of the thrust receiver 22 is in a range of HRC 60~67. When the hardness of the thrust receiver 22 is made lower than HRC 60, it becomes difficult to use the thrust receiver 22 as the pressing member, and when the hardness of the thrust receiver 22 is made higher than HRC 67, the heat treatment of the thrust receiver 22 becomes difficult.

When the concave spherical surface 13 is formed by plastic deformation on the end surface 12 of the shaft member 10 before hardening and tempering, depending on the manner of handling of the shaft member 10, scratches are easily caused on the concave spherical surface 13 and on the peripheral surface of the shaft member 10 during intermediate processes until the hardness of the shaft member 10 is actually increased.

Moreover, a deformation due to the heat treatment is caused on the concave construct such that the thrust receiver 22 is attracted towards the shaft member 10 by an attraction force in the axial direction produced between the rotor magnet and the stator coil.

While certain embodiments of the invention have been described in detail above in relation to bearing devices and methods for manufacturing the same, it will be apparent to those skilled in the art that the disclosed embodiment may be modified. Therefore, the foregoing description is to be considered exemplary rather than limiting, and the true scope of the invention is that defined in the following claims.

What is claimed is:

1. A bearing device, comprising:
    a shaft member having a hardness in a range of $H_RC40$ or higher;
    a sleeve fitted around said shaft member so that one of said shaft member and said sleeve is rotatably supported by the other through a radial bearing; and
    a thrust receiver secured to one end portion of said sleeve in an axial direction thereof, said thrust receiver and an end surface of said shaft member opposing to each other in the axial direction forming a thrust bearing therebetween, said thrust receiver having a hardness in a range of $H_RC$ 60 or higher;
    said thrust receiver having a convex spherical surface extending in an axial direction at the center of the surface opposing to said end surface of said shaft member;
    said end surface of said shaft member opposing to said convex spherical surface having a concave spherical surface formed thereon by a plastic deformation, and having a radius of curvature larger than a radius of curvature of said convex spherical surface of said thrust receiver, said concave spherical surface being strain hardened due to the plastic deformation.

2. A bearing device according to claim 1 wherein said thrust receiver is a spherical member.

3. A bearing device according to claim 1 wherein said thrust receiver is made of cemented carbide and is harder than said shaft member.

* * * * *